United States Patent
Ortiz, Jr.

(10) Patent No.: US 8,434,139 B1
(45) Date of Patent: Apr. 30, 2013

(54) UTILIZING COMMUNICATIONS OBFUSCATION PROXY TO PROTECT SYSTEM SERVICES

(75) Inventor: Efrain Ortiz, Jr., Conshohocken, PA (US)

(73) Assignee: Symantec Corporation, Mountain View, CA (US)

( * ) Notice: Subject to any disclaimer, the term of this patent is extended or adjusted under 35 U.S.C. 154(b) by 902 days.

(21) Appl. No.: 12/557,219

(22) Filed: Sep. 10, 2009

(51) Int. Cl.
*H04L 29/06* (2006.01)

(52) U.S. Cl.
USPC .............. 726/11; 713/152; 713/162; 709/227

(58) Field of Classification Search .................. None
See application file for complete search history.

(56) References Cited

U.S. PATENT DOCUMENTS

| 2005/0060534 A1* | 3/2005 | Marvasti ........................ 713/151 |
| 2005/0132060 A1* | 6/2005 | Mo et al. ........................ 709/227 |
| 2009/0064304 A1* | 3/2009 | Cohen et al. .................... 726/11 |

* cited by examiner

*Primary Examiner* — Gilberto Barron, Jr.
*Assistant Examiner* — Virginia T Ho
(74) *Attorney, Agent, or Firm* — Fenwick & West LLP (57) ABSTRACT

A server protected by a firewall uses an obfuscation algorithm to periodically generate a source port number and a destination port number. The server periodically sends an outbound packet from the source port to the destination port of an arbitrary destination network address. The outbound packet passes through the firewall and configures the state table of the firewall to temporarily pass inbound packets from the destination port of the arbitrary network address to the source port of the server. A client uses the obfuscation algorithm to send a packet from the destination port of the client to the source port of the server. The packet from the client indicates that it was sent from the arbitrary destination network address and includes the real port and network address of the client within it. The server communicates with the client at the real port and network address.

18 Claims, 4 Drawing Sheets

UTILIZING COMMUNICATIONS OBFUSCATION PROXY TO PROTECT SYSTEM SERVICES

BACKGROUND

1. Field of the Invention

This invention pertains in general to computer security and in particular to providing secure remote access to network services.

2. Description of the Related Art

Network entities providing services to remote users are vulnerable to attack. Oftentimes, it is desirable to make services on a server or other entity available to remote users. For example, an individual having a home server might want to have remote access in order to retrieve media or other content stored on the home server. Similarly, an enterprise operating a set of servers might want to allow remote access to the servers in order to allow employees to perform remote maintenance and similar tasks.

Oftentimes a server on a public network such as the Internet is protected by a firewall that blocks unauthorized traffic to the server. In order to allow remote access to the server, an administrator of the server configures the firewall to allow access to the server's network ports used by the services that are to be accessed remotely. The applications running on the server to provide the services, in turn, are secured to resist unauthorized network access.

However, even supposedly secure applications are subject to attack via the network. Servers on public networks are under constant threat of attack, and any open port is an invitation for an attacker to try to identify and exploit any security vulnerabilities that might be present in the applications. Such applications are especially vulnerable to so-called "zero day attacks" where a vulnerability that was not previously known is used to exploit and comprise applications that were thought to be secure. Therefore, it is risky to open any firewall ports in order to provide remote access to services on a server connected to a public network.

SUMMARY

The problems described above are addressed by a method and computer-readable storage medium. Embodiments of the method establish a communications channel between a client and a server through a firewall. The method comprise using an obfuscation algorithm at the server to generate a source port number identifying a source port number and a destination port number identifying a destination port. The method sends an outbound packet from the server to an arbitrary destination network address, where the outbound packet is sent from the source port of the server to the destination port of the arbitrary destination network address and passes through the firewall. The method receives an inbound packet at the server source port of the server, the inbound packet sent by the destination port of the client and passing through the firewall, the packet indicating that the packet was sent from the arbitrary destination network address and establishing the communications channel between the client and the server responsive to receipt of the inbound packet.

Another embodiment of the method comprises using an obfuscation algorithm to generate an arbitrary network address, a source port number identifying a source port, and a destination port number identifying a destination port. The method sends an outbound packet from the client to the server, the outbound packet sent from the destination port of the client to the source port of the server and passing through the firewall, the outbound packet indicating that the packet was sent from the arbitrary destination network address and including within the packet a real network address and real port number of the client. The method receives an inbound packet at the real port number of the real network address of the client, the inbound packet sent by the server responsive to the server receiving the outbound packet through the firewall and establishes the communications channel between the client and the server responsive to receipt of the inbound packet.

Embodiments of the computer-readable storage medium establish a communications channel between a client and a server through a firewall. The computer-readable storage medium comprises executable computer program instructions. The instructions are for using an obfuscation algorithm at the server to generate a source port number identifying a source port number and a destination port number identifying a destination port. The instructions are further for sending an outbound packet from the server to an arbitrary destination network address, where the outbound packet is sent from the source port of the server to the destination port of the arbitrary destination network address and passes through the firewall. The instructions are also for receiving an inbound packet at the server source port of the server, the inbound packet sent by the destination port of the client and passing through the firewall, the packet indicating that the packet was sent from the arbitrary destination network address and for establishing the communications channel between the client and the server responsive to receipt of the inbound packet.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
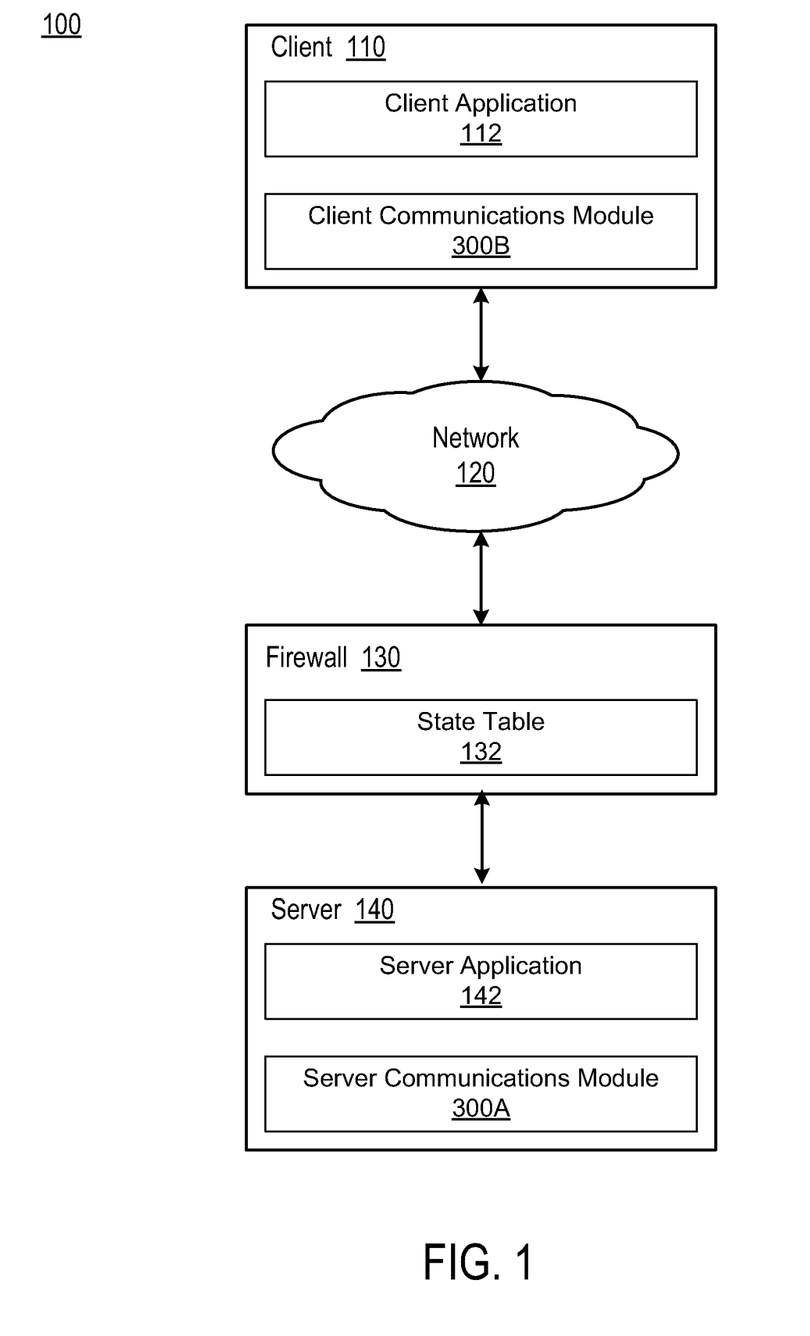
FIG. 1 is a high-level diagram illustrating an environment for establishing secure communications channels for network applications according to one embodiment.

FIG. 1 is a high-level diagram illustrating an environment 100 for establishing secure communications channels for network applications according to one embodiment. The illustrated environment 100 comprises a client 110, a firewall 130, and a server 140 interconnected via a public computer network 120 such as the Internet. Only one of each entity is shown in FIG. 1 in order to simplify and clarify the figure. Embodiments of the environment 100 can include many clients 110, firewalls 130, and servers 140 connected to the network 120.

The illustrated environment 100 represents a typical computing environment where a user of the client 110 interacts with the server 140 protected by the firewall 130. In this environment, a client application 112 running on the client 110 communicates with a server application 142 running on the server 140 over a secure communications channel. The secure communications channel is established by the server 300A and client 300B communications modules 300A-B through the firewall 130. The firewall blocks 130 blocks all ports except for a pair of ports known to only the communications modules 300A-B. The unblocked ports, and the network address that is allowed to access the ports, are periodically changed. Since there are upward of 64,000 possible ports many possible network addresses, an attacker is extremely unlikely to know the network address and port combination that would reveal the unblocked ports. Therefore, the technique described herein provides security through obfuscation and breaks the reconnaissance phase of the attacker's penetration testing since all ports will appear blocked. This approach substantially mitigates the risks presented by zero day attacks and other similar exploits.

Turning now to the individual entities illustrated in FIG. 1, the network 120 enables communications among the client 110, the firewall 130 and the server 140. In one embodiment the network 120 is a public network such as the Internet. The network 120 uses standard communications technologies and/or protocols. Thus, the network 120 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The firewall 130 prevents unauthorized access to the server 140. In one embodiment, the firewall 130 is situated at a peering point between a private network on which the server 140 resides and the public network 120. Thus, all traffic between the public network 120 and the server 140 passes through the firewall 130. The firewall 130 can be standalone device or integrated into a router or other device.

In one embodiment, the firewall 130 implements a security policy that blocks substantially all network traffic inbound from the network 120 to the server 140. Thus, the firewall 130 blocks traffic directed to essentially all ports of the server 140 from essentially all network addresses. The firewall 130 does, however, allow communications from network address/port combinations to which the server 140 has previously communicated.

To this end, the firewall 130 maintains a state table 132 that tracks the state of network connections travelling across it. Generally, the state table 132 specifies open connections through which traffic from the network 120 can pass through the firewall 130 to the server 140. In one embodiment, the state table 132 records the source port, destination address, and destination port of an outbound network communication from the server 140. For a limited period of time, e.g., five minutes, the firewall 130 allows inbound traffic from the destination address and port directed to the source port through the firewall to the server 140.

The server 140 is computer that provides services to remote clients 110 via the network 120. For example, the server 140 can be a home computer that provides services such as serving media or other content or controlling access to home control systems. The server 140 can also be a computer operated by an enterprise, such as an e-mail server or a web server. In one embodiment, the server 140 is located at a fixed network address.

In one embodiment, the server 140 includes a server application 142 that provides remotely-accessible services. The application 142 can be, for example, a secure shell (SSH) daemon, a media server, an e-mail application, or any other application that provides a network-accessible interface. Although FIG. 1 illustrates only a single application 142, there can in fact be multiple applications running on the server 140.

The server 140 also includes a server communications module 300A. The server communications module 300A establishes secure communications channels with remote clients 110 through the firewall 130 via the network 120. The server communications module 300A acts as a local proxy for communications between applications 142 executing on the server 140 and the network 120.

To establish the secure communications channel, the server communications module 300A periodically sends an outbound network communication through the firewall 130 to the network 120. The outbound communication is sent from an arbitrary source port number to an arbitrary destination network address and arbitrary destination port number, where the arbitrary values can differ for each period and are generated using a deterministic obfuscation algorithm that is shared with the client 110. This outbound communication has the effect of configuring the firewall 130 to temporarily allow inbound communications from the destination network address/destination port that are directed to the source port.

The server communications module 300A can thus receive an inbound communication from a client that knows the obfuscation algorithm and can generate the network address and ports for the given period. If the server communications module 300A receives such a communication, it analyzes data within the communication to authenticate the client and identify the network address of the client 110, and uses this information to establish a secure communications channel with the client 110.

The client 110, in turn, is a computer, mobile telephone, or other electronic device used by one or more users to perform activities including executing applications that access services provided by the server 140. For example, the client 110 can be a mobile computer that the user uses while travelling, or a desktop computer that the user uses while remote from the location of the server 140. The application 112 executed by the client can be, for example, a media player for playing music served by the server 140 or a SSH client providing an interface for accessing the server. Although FIG. 1 illustrates only a single application 112, there can in fact be multiple applications running on the client 110.

The client 110 includes a client communications module 300B that acts as a counterpart to the communications module 300A in the server 140. To this end, the client communications module 300B establishes a secure communications channel with the remote server 140 through the firewall 130. The client communications module 300B also acts as a local proxy for communications between applications 112 executing on the client 110 and the network 120.

The client application 112 interacts with the client communications module 300B to establish a secure communications channel with the server 140. When the client application 112 requests a connection, the client communications module 300B generates the network address and port numbers for the current period using the obfuscation algorithm shared with the server communications module 300A. The client communications module 300B then sends a network communication directed to the generated port number and fixed network address of the server 140. This network communication is sent from the appropriate port of the client 112 and is configured to appear as if it were sent from the generated network address (i.e., it spoofs the generated address as the originating address of the packet from the client 110). In addition, the network communication includes information authenticating the client and identifying the true network address and port that the server communications module 300A can use to contact the client 110. This spoofed communication passes through the firewall 130 to the server 140. The server 140 can analyze the communication to identify the true network address of the client 110 and use that address to establish a communications session between the server and client.

Figure 2:
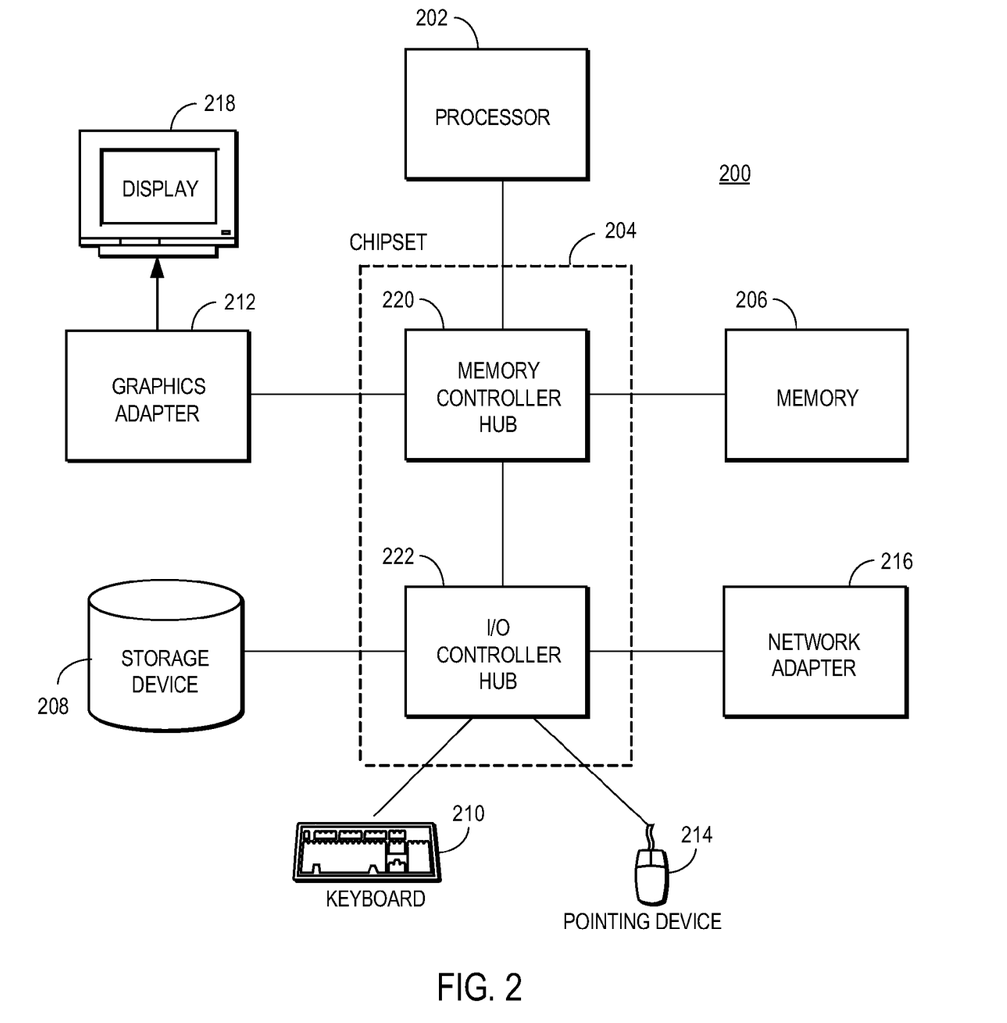
FIG. 2 is a high-level block diagram of a computer for acting as a client, a firewall, or a server according to one embodiment.

FIG. 2 is a high-level block diagram of a computer 200 for acting as a client 110, a firewall 130, or a server 140 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. In one embodiment, a computer 200 acting as a server 140 can lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3A:
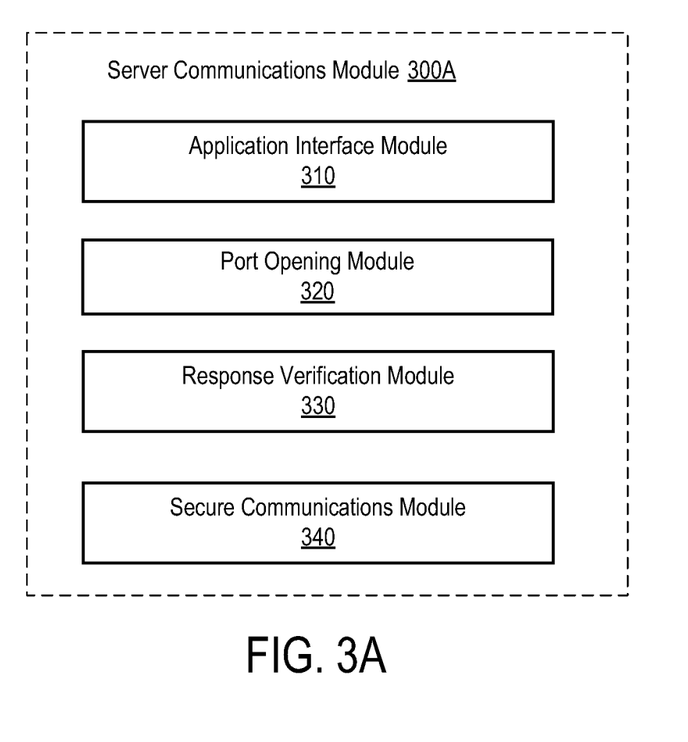
FIG. 3A is a high-level block diagram illustrating modules within the server communications module of a server according to one embodiment.

FIG. 3A is a high-level block diagram illustrating modules within the server communications module 300A of a server 140 according to one embodiment. The server communications module 300A includes an application interface module 310, a port opening module 320, a response verification module 330 and a secure communications module 340.

An application interface module 310 interconnects the server application 142 and the server communications module 300A. The application interface module 310 serves to isolate the application 142 from the functions of the server communications module 300A so that the application need not be modified to take advantage of the secure communications channel. In one embodiment, the application interface module 310 initiates a local proxy loop for the server application 142. This loop intercepts network communications sent by the application 142 on the application's local port and forwards the communications to the port used by the server communications module 300A. Similarly, the loop receives communications received from the network 120 on the port used by the server communications module 300A destined for the application 142 and forwards the communications to the application's local port.

The port opening module 320 opens a port in the firewall 130 through which a client 110 can communicate with the server 140. In one embodiment, the port opening module 320 uses a seeded deterministic obfuscation algorithm to generate a source port number, a destination IP address, and a destination port number. The obfuscation algorithm can be, for example, a hash function and always generates the same IP address and port numbers given the same seed. In one embodiment, the seed is based on the current time and the obfuscation algorithm is configured to generate different IP addresses and port numbers in different time intervals. The duration of the time interval can vary and in one embodiment is five minutes. The port opening module 320 can determine the current time using a network-based time server. Other embodiments of the obfuscation algorithm use other values as the seed.

In one embodiment, the IP address generated by the obfuscation algorithm is a registered but unused address in order to avoid overloading a real IP address on the network 120. The obfuscation algorithm can, for example, select an IP address from a pool of known unused IP address based on the seed. The port numbers can include any of the approximately 64,000 possible ports, or a predetermined subset of these ports. Depending upon the embodiment, the source and destination port numbers produced by the obfuscation algorithm can be the same or different.

To open the firewall 130 port, an embodiment of the port opening module 320 periodically generates a UDP packet and sends it from the generated source port number to the generated destination IP address and generated destination port number. The frequency at which the UDP packet is sent can depend upon the embodiment. Generally, the port opening module 320 sends the packet frequently enough to maintain an open input connection in the firewall 130 state table 132. This outbound UDP packet will not receive a response unless a client 110 is ready to initiate a connection.

A response verification module 330 receives an inbound response to the outbound UDP packet and authenticates the client 110 by verifying the response. The inbound response is a second UDP packet sent from the generated destination port number to the generated source port number and indicating (i.e., spoofing) that it was sent from the generated destination IP address. In one embodiment, the data portion of the inbound UDP packet contains an encrypted value that authenticates the client 110. The encrypted value can be, for example, a result of applying a certificate-based public key encryption algorithm to a secret key shared by the client 110 and server 140. The responsive verification module 330 decrypts and verifies the encrypted key to authenticate the client 110. Assuming the client 110 authenticates, the response verification module also determines the real IP address and local service port of the client 110. In one embodiment, the real IP address and port number are contained in an IP packet encapsulated by the UDP packet. The real IP address and port number can be encrypted.

If the client 110 authenticates, the secure communications module 340 establishes a secure communication channel between the server 140 and the client 110. The secure communications module 340 initiates a network connection to the real IP address and local port number of the client 110 as specified by the inbound packet received from the client 110. At this point the server 130 and client 110 can communicate through the firewall 130 using conventional techniques.

Figure 3B:
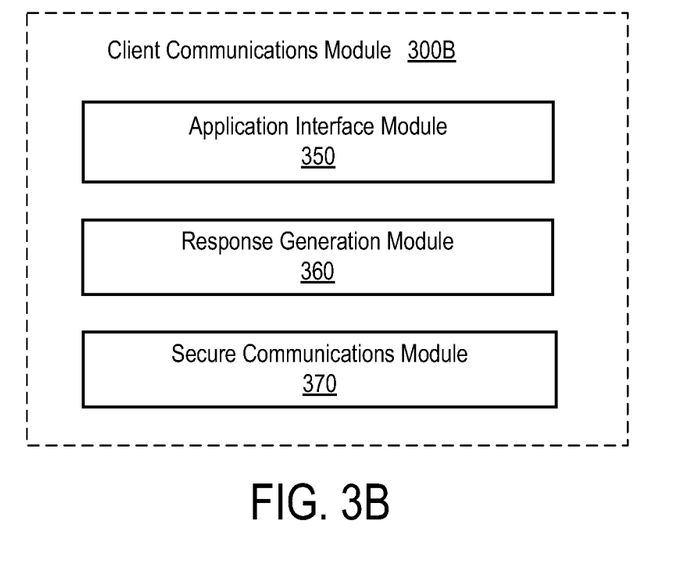
FIG. 3B is a high-level block diagram illustrating modules within the client communications module of a client according to one embodiment.

FIG. 3B is a high-level block diagram illustrating modules within the client communications module 300B of a client 110 according to one embodiment. The client communications module 300B includes an application interface module 350, a response generation module 360 and a secure communications module 370.

An application interface module 350 interconnects the client application 112 and the client communications module 300B. As with the counterpart module 310 in the server communication module 300A, the client application interface module 350 isolates the client application 112 from the functions of the client communications module 300B. In one embodiment, the application interface module 350 uses a local loop to intercept network communications sent by the application 112 on its local port and forward the communications to the port used by the client communications module 300B. Similarly, the loop transfers communications received from the network 120 on the port used by the client communications module 300B destined for the application 112 and forwards the communications to the application's local port.

The response generation module 360 generates a response that initiates a connection with the server 140. In one embodiment, the response generation module 360 detects, via the application interface module 350, that the client application 112 has sent a network communication directed to the server 140. For example, the user of the client 110 can execute the client application 112, such as a SSH client, and attempt to connect to the server 140. This connection attempt will cause the SSH client to interact with the application interface module 350, which will then cause the interface module to notify the response generation module 360 to initiate a connection with the server 140.

To initiate the connection, the response generation module 360 determines the secret key and obfuscation algorithm for the server 140. In one embodiment, the response generation module 360 maintains a list of known trusted servers to which the client 110 can securely connect. The list includes one or more secret keys for each server 140, and can also indicate the obfuscation algorithm used by the server. The response generation module 360 determines the server 140 to which the client application 112 seeks to connect, and determines the key and obfuscation algorithm for that server.

The response generation module 360 uses the key and obfuscation algorithm to generate a response packet for the server 140. The response generation module 360 determines the seed to the obfuscation algorithm by, for example, accessing a network time server to determine the current time, and uses the seed and obfuscation algorithm to generate the destination IP address and source and destination port numbers associated with the server 140 for the current time period. The response generation module 360 creates a UDP packet destined for the IP address and the generated source port number of the server 140. This packet indicates that it was sent by (i.e., spoofs) the generated destination IP address and is sent from the generated destination port number. The response generation module 360 also uses the secret key to generate an authentication value authenticating the client 110 and stores this value in the data portion of the UDP packet. Further, the response generation module 360 embeds an IP data packet within the UDP packet indicating the real IP address of the client 110 and the port at the client to which the server 140 should connect. The response generation module 360 sends the UDP packet to the server 140.

The UDP packet passes through the firewall 130 to the server 140 as described above, and the server 140, in turn, initiates a network connection to the IP address and local port of the client 110 specified by the embedded IP data packet. The secure communications module 370 in the client communications module 300B interacts with the server 140 and establishes the secure communication channel. To this end, the secure communications module 370 obtains the port number to which the server 140 should connect from the response generation module 360, and listens for the packets from the server 140 at that port number. When a packet from the server 140 arrives at the port, the secure communications module 370 responds and establishes the connection. The client application 112 communicates with the server 140 via the local proxy loop created by the application interface module 350.

Figure 4:
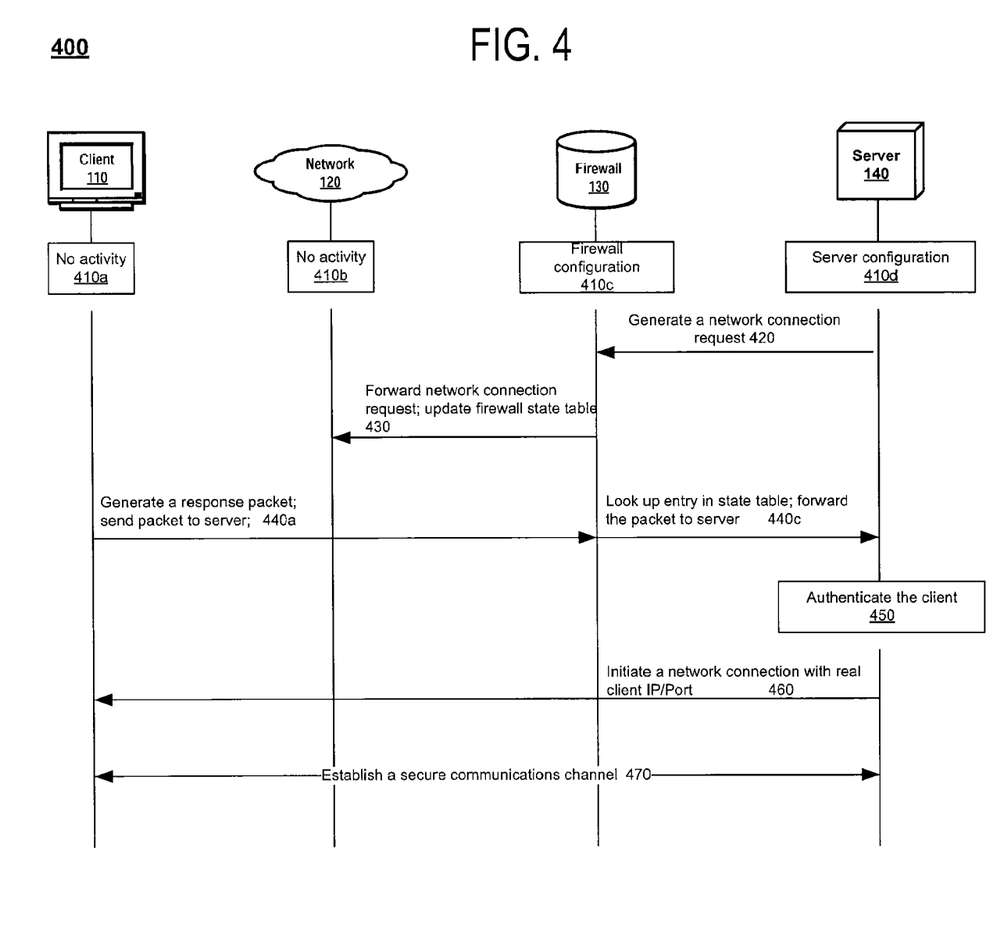
FIG. 4 is a flow chart illustrating steps performed by the communications modules of a client and a server to establish a secure communications channel for an application according to one embodiment.

FIG. 4 is a sequence diagram illustrating steps performed by the communications modules 300A-B of the client 110 and server 140 to establish a secure communications channel for an application according to one embodiment. In the diagram, four vertical lines respectively represent the client 110, network 120, firewall 130, and server 140. Time flows from the top to the bottom of the figure and the horizontal lines between the entities represent communications. Boxes on the vertical lines represent activities performed by the associated entity. Other embodiments can perform the steps of FIG. 4 in different orders. Moreover, other embodiments can include different and/or additional steps and communications than the ones described here.

Initially, the client 110 and the network 120 have no activity 410a-b. The firewall 130 is configured to block all inbound connection requests to the server 140. The server 140 is configured to use the server communications module 300A.

The server 140 generates 420 an outbound network connection request sent from an arbitrary source port number to an arbitrary destination port number at an arbitrary destination IP address. The server 140 determines the IP address and port numbers using an obfuscation algorithm based on a seed value such as the current time. The server 140 periodically generates new outbound network connection requests with different IP addresses and/or port numbers. The firewall 130 forwards 430 the outbound network connection request to the network 120. During the forwarding, the firewall 130 updates 430 its state table 132 to indicate that inbound connections to the port number are allowed from the destination port number of the destination IP address.

Once a user of the client 110 wishes to communicate with a service provided by the server application 142, the client 110 generates 440a a packet for the server 140. The client 110 uses the seed value (e.g., current time) and obfuscation algorithm to generate the destination IP address and source/destination port numbers for communicating with the server, and generates the packet to the source port number of the IP address of the server. The packet indicates that it is from (spoofs) the destination IP address and is sent from the generated destination port number. In addition, the client 110 uses a key shared with the server 140 to generate a value authenticating the client. The client 110 stores the authentication value in the packet and also embeds a packet in the generated packet that includes the true IP address and local port of the client 110.

The packet from the client 110 arrives at the firewall 130 and the firewall 130 checks the response against its state table 132. If the packet is sent from the destination IP address and port number, and is sent to the source port number of the server 140, the client packet will match the open inbound connection indicated by the state table and the firewall 130 forwards 440*c* it to the server 140. The server 140 receives the packet and authenticates 450 the client 110. If the client authenticates, the server 140 initiates 460 a network connection with the client 110 using the real IP address and the port number of the client 110 as specified within the packet. The client 110 and server 140 then establish 470 a secure communications channel.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of establishing a communications channel between a client and a server connected by a network, the network having a firewall disposed between the client and server, comprising:
using an obfuscation algorithm to generate a source port number identifying a source port and a destination port number identifying a destination port;
sending an outbound packet from the server to an arbitrary destination network address, the outbound packet sent from the source port of the server to the destination port of the arbitrary destination network address and passing through the firewall, wherein the client is located at a client network address, the client network address and the arbitrary network address are different, and the outbound packet sent from the server is not received by the client;
receiving an inbound packet at the source port of the server, the inbound packet sent by the destination port of the client and passing through the firewall, the packet indicating that the packet was sent from the arbitrary destination network address; and
establishing the communications channel between the client and the server responsive to receipt of the inbound packet.

2. The method of claim 1, wherein the outbound packet is periodically sent from the server to the arbitrary destination network address, and wherein the source port and the destination port change with each period.

3. The method of claim 2, further comprising:
using the obfuscation algorithm to generate the arbitrary network destination address, and wherein the arbitrary network destination address changes with each period.

4. The method of claim 1, wherein using the obfuscation algorithm comprises applying a seed to the obfuscation algorithm to produce the source port number and the destination port number, wherein the seed is based on a current time.

5. The method of claim 1, wherein the firewall blocks all communications inbound to the server except communications indicated as permitted by a state table, and wherein the outbound packet passing through the firewall configures the state table to permit an inbound communication to the source port from the destination port of the arbitrary network address.

6. The method of claim 1, wherein receiving an inbound packet at the source port of the server comprises:
authenticating that the inbound packet was sent by the client; and
examining the inbound packet to ascertain a real network address and real port number of the client, wherein the real network address is different than the arbitrary destination network address and the real port number is different than the destination port number.

7. The method of claim 6, wherein establishing the communications channel comprises sending an outbound packet from the server to the real port number of the real client network address.

8. A method of establishing a communications channel between a client and a server connected by a network, the network having a firewall disposed between the client and server, comprising:
using an obfuscation algorithm to generate an arbitrary network address, a source port number identifying a source port, and a destination port number identifying a destination port;
sending an outbound packet from the client to the server, the outbound packet sent from the destination port of the client to the source port of the server and passing through the firewall, the outbound packet indicating that the packet was sent from the arbitrary destination network address and including within the packet a real network address and real port number of the client;
receiving an inbound packet at the real port number of the real network address of the client, the inbound packet sent by the server responsive to the server receiving the outbound packet through the firewall; and
establishing the communications channel between the client and the server responsive to receipt of the inbound packet.

9. The method of claim 8, wherein using the obfuscation algorithm comprises applying a seed to the obfuscation algorithm to produce at least the source port number and the destination port number, wherein the seed is based on a current time.

10. The method of claim 8, wherein the real network address of the client is different than the arbitrary network address.

11. The method of claim 8, wherein the firewall blocks all communications inbound to the server except communications indicated as permitted by a state table, and wherein the state table is configured to pass the outbound packet from the client to the server responsive to a prior packet sent from the source port of the server to the destination port of the arbitrary network address.

12. The method of claim 8, wherein sending the outbound packet comprises inserting a value authenticating the client into the outbound packet.

13. A non-transitory computer-readable storage medium storing executable computer program instructions for establishing a communications channel between a client and a server connected by a network, the network having a firewall disposed between the client and server, comprising computer program instructions for:
using an obfuscation algorithm to generate a source port number identifying a source port and a destination port number identifying a destination port;

sending an outbound packet from the server to an arbitrary destination network address, the outbound packet sent from the source port of the server to the destination port of the arbitrary destination network address and passing through the firewall, wherein the client is located at a client network address, the client network address and the arbitrary network address are different, and the outbound packet sent from the server is not received by the client;

receiving an inbound packet at the source port of the server, the inbound packet sent by the destination port of the client and passing through the firewall, the packet indicating that the packet was sent from the arbitrary destination network address; and establishing the communications channel between the client and the server responsive to receipt of the inbound packet.

14. The computer-readable storage medium of claim 13, wherein the outbound packet is periodically sent from the server to the arbitrary destination network address, and wherein the source port and the destination port change with each period.

15. The computer-readable storage medium of claim 14, further comprising computer program instructions for:

using the obfuscation algorithm to generate the arbitrary network destination address, and wherein the arbitrary network destination address changes with each period.

16. The computer-readable storage medium of claim 13, wherein the computer program instructions for using the obfuscation algorithm comprises computer program instructions for applying a seed to the obfuscation algorithm to produce the source port number and the destination port number, wherein the seed is based on a current time.

17. The computer-readable storage medium of claim 13, wherein the firewall blocks all communications inbound to the server except communications indicated as permitted by a state table, and wherein the outbound packet passing through the firewall configures the state table to permit an inbound communication to the source port from the destination port of the arbitrary network address.

18. The computer-readable storage medium of claim 13, wherein the computer program instructions for receiving an inbound packet at the server source port of the server comprises computer program instructions for:

authenticating that the inbound packet was sent by the client; and examining the inbound packet to ascertain a real network address and real port number of the client, wherein the real network address is different than the arbitrary destination network address and the real port number is different than the destination port number.

* * * * *